L. MAISEL.
MEASURING DEVICE.
APPLICATION FILED MAR. 2, 1909.
933,773.
Patented Sept. 14, 1909.
2 SHEETS—SHEET 1.
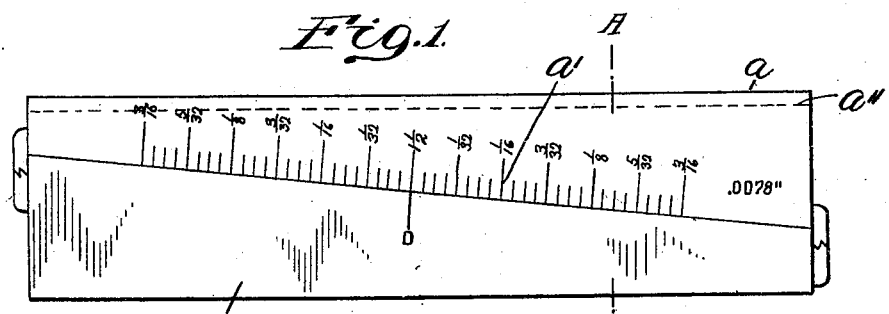
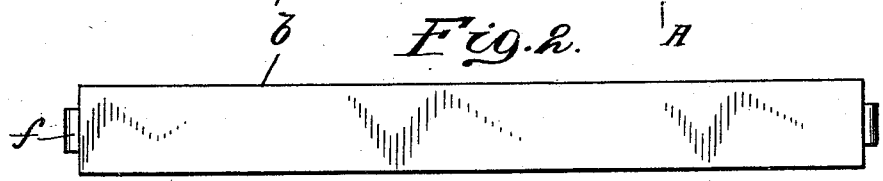
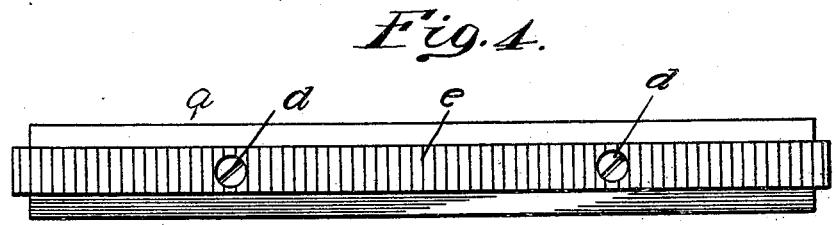
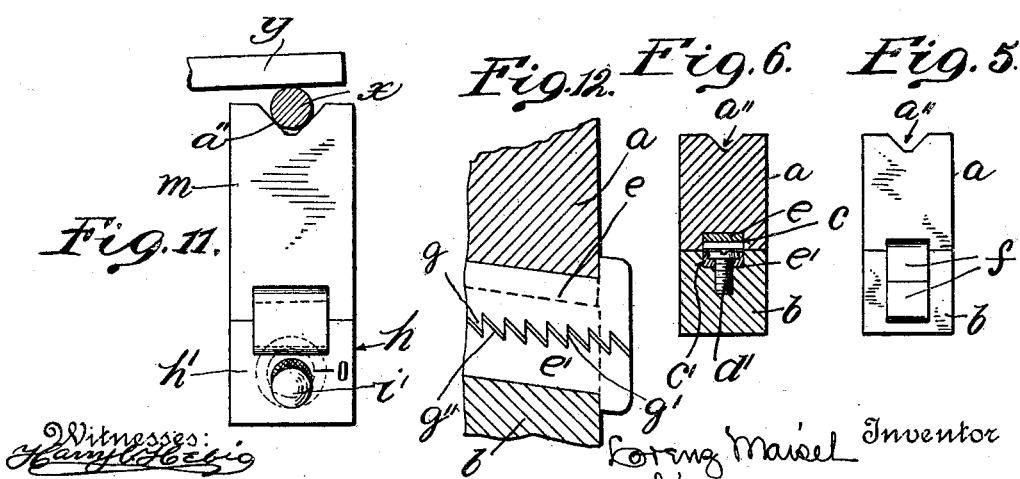

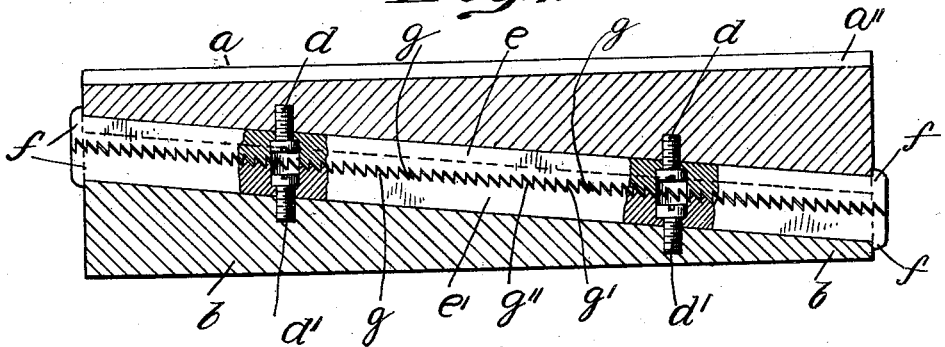

UNITED STATES PATENT OFFICE.

LORENZ MAISEL, OF BELOIT, WISCONSIN.

MEASURING DEVICE.

933,773.  Specification of Letters Patent.  Patented Sept. 14, 1909.

Application filed March 2, 1909. Serial No. 480,860.

*To all whom it may concern:*

Be it known that I, LORENZ MAISEL, a citizen of the United States, residing at Beloit, in the county of Rock and State of Wisconsin, have invented certain new and useful Improvements in Measuring Devices, of which the following is a specification, reference being had to the accompanying drawings.

My invention relates to improvements in measuring instruments and particularly to improvements in combined parallels (or parallel-blocks) and V-blocks.

An object of my invention is to provide a measuring instrument of the class described which will be simple in construction, comparatively cheap in manufacture and most accurate and reliable in use.

In the drawings illustrating the principle of my invention and the best mode now known to me of applying that principle, Figure 1 is a side elevation; Fig. 2 is a bottom plan view; Fig. 3 is a top plan view; Fig. 4 is a plan view of the rack mounted in the scale member; Fig. 5 is an end view; Fig. 6 is a section on the line A—A of Fig. 1; Fig. 7 is a central longitudinal section of the parts assembled; Fig. 8 shows in side elevation the scale-member displaced from the zero point and relatively to the base-member; Figs. 9 and 10 are elevations of the scale-member and the base member, respectively, of a modified form; Fig. 11 shows assembled and in end view the modified form the parts of which are illustrated in Figs. 9 and 10; Fig. 12 is a detail showing the engagement of the teeth of the racks; Fig. 13 is a detail showing the engagement of the screw and mutilated nut and Fig. 14 is a detail showing the micrometer-scale on the head of the screw shaft.

The scale-member $a$ is formed with a graduated limb $a'$ on one side, as is shown in Fig. 1, and is formed in its top with a V-shaped groove $a''$. The base member $b$ bears an index-mark or zero-mark which coöperates with the graduations on the limb $a'$ of the scale-member $a$, as is shown in Fig. 1. In the opposed faces of the scale-members $a$ and $b$ are formed channels $c$, $c'$. (Fig. 6). In the channel $c$ is fastened by screws $d$ a rack $e$; and in the channel $c'$ is fastened by screws $d'$ a rack $e'$. The toothed face of the rack $e'$ is sunk below the level of the walls of the channel $c'$, while the rack $e$ projects out of the channel $c$ throughout its entire length so that its toothed face lies beyond the walls of the channel $c$ (Figs. 6 and 7). Each rack $e$, $e'$ is formed with a shoulder $f$ at each end (Fig. 7); and these shoulders $f$ tend to hold securely in place the rack. The teeth $g$ of the racks $e$, $e'$ are so shaped that they bear along only their normally vertical faces $g'$ and that an open space $g''$ is left between the normally inclined faces of the teeth. The only pressure which comes upon the teeth $g$ of the racks $e$, $e'$ is that caused by the tendency of the scale-member $a$ to slide lengthwise relatively to the base-member $b$; and this pressure, it will be seen from a study of Fig. 7, is very slight. The weight of the scale-member $a$ is supported by the walls of the channel $c'$ upon which walls rest the walls of the channel $c$. The screws $d$, $d'$ withstand very little of the stress due to the weight of the scale-member $a$ and serve really only to prevent the racks $e$, $e'$ from falling out of their respective channels $c$, $c'$.

In the modification shown in Figs. 9, 10 and 11, there is journaled in the base-member $b$ a shaft $i$ upon one end of which is mounted a milled head $i'$ formed with micrometer graduations $i''$. The shaft $i$ carries a screw $j$ which engages the mutilated nut $k$ of the scale-member $m$. The base-member $h$ carries an index-mark $h'$ which coöperates with the micrometer graduations $i''$ on the milled head $i'$. This affords means for obtaining a very fine adjustment of the instrument and makes the latter capable of measuring very fine displacements.

The V-shaped groove shown at $a''$ is adapted to receive a steel rod $x$ by which the work $y$ may be supported and held so as not to rest upon an edge of the upper member $a$ (Fig. 11). Where the work is higher at one end than at the other, it is found desirable to use the steel rod $x$ in the V-shaped groove for the purpose just described.

My new instrument hereinbefore described can be used as an adjustable parallel, as an adjustable V-block, as a gage for planer work and as a gage for standard measurements. The peculiar construction by which an open space is left between the teeth of the two racks and these teeth touch along only the normally vertical faces and which relieves the racks from pressure due to the weight of the scale-member, preserves the teeth and endows the instrument with greater strength, durability and stability. Further, this same construction, by leaving an opening between the normally inclined faces of the teeth, prevents the accuracy of the instrument being impaired by small particles of dirt or grease entering between the teeth. Where the teeth contact along both their straight faces and their inclined faces, such dirt and grease affect the accuracy of the tool and make it less reliable and less easy to adjust. The shoulders at the ends of the racks rigidly hold them in position and give the instrument a solidity of structure which enhances its accuracy and lengthens its life.

I claim:

1. The combination of a pair of wedge shaped members adapted to slide upon each other and formed with slots; and a pair of toothed members mounted in said slots, the teeth of said toothed members fitting so as to leave a space between them for the reception of oil, filings and dirt without the latter's affecting the accuracy of the instrument.

2. The combination of a pair of wedge shaped members adapted to slide upon each other and formed with slots in their opposing edges; and a pair of toothed members mounted in said slots and formed with shoulders which engage the ends of said wedge shaped members, whereby said racks are held rigidly in place.

3. The combination of a pair of wedge shaped members adapted to slide upon each other and formed with slots in their opposing edges; and a pair of toothed members mounted in said slots, said toothed members having teeth adapted to engage one another and leave between the engaging teeth a space for the reception of oil, filings and dirt; said toothed members being further formed with shoulders which engage the end-walls of said wedge shaped members and thereby hold said toothed members rigidly in place.

4. The combination of a pair of wedge shaped members adapted to slide upon each other and formed with slots in their opposing edges and one having a V-shaped groove in its top; a rounded bar which lies in said groove and a pair of toothed members mounted in said slots and adapted to engage with each other.

In testimony whereof I have hereunto set my hand at said Beloit this 15th day of February, A. D., 1909, in the presence of the two undersigned witnesses.

LORENZ MAISEL.

Witnesses:
H. U. ADAMS,
CLARA BAUKIN.